R. B. BENJAMIN.
ELECTRICAL CONNECTOR.
APPLICATION FILED APR. 27, 1916. RENEWED MAR. 22, 1919.

1,319,920.

Patented Oct. 28, 1919.
2 SHEETS—SHEET 1.

Witnesses:

Inventor:
Reuben B. Benjamin
by Jones, Addington, Ames & Seibold
Attys.

R. B. BENJAMIN.
ELECTRICAL CONNECTOR.
APPLICATION FILED APR. 27, 1916. RENEWED MAR. 22, 1919.
1,319,920.
Patented Oct. 28, 1919.
2 SHEETS—SHEET 2.
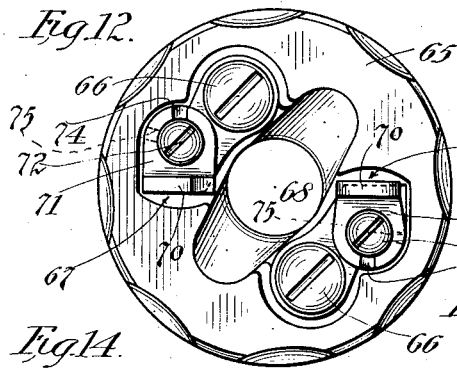
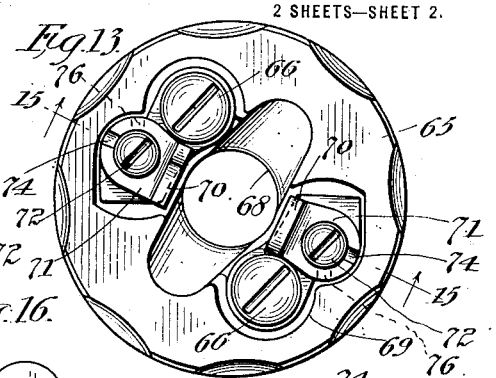
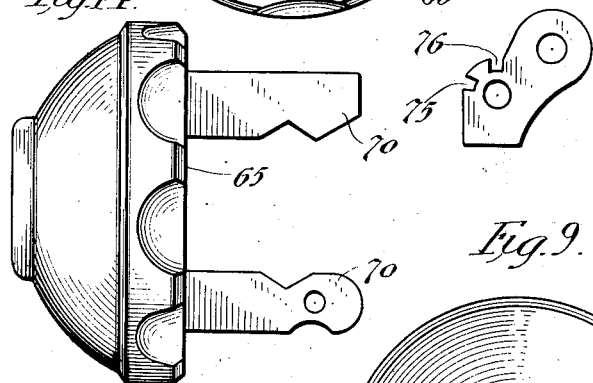
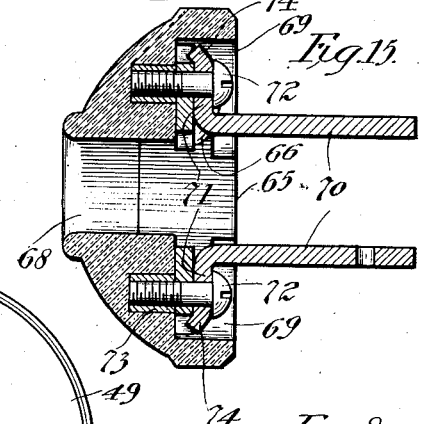
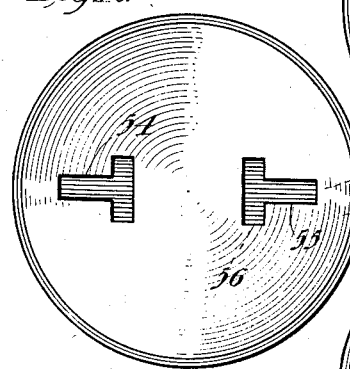
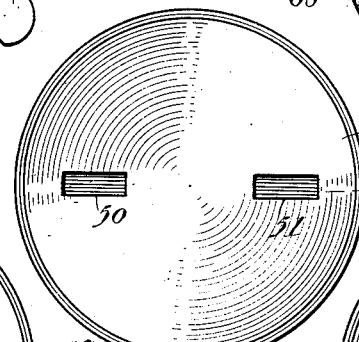
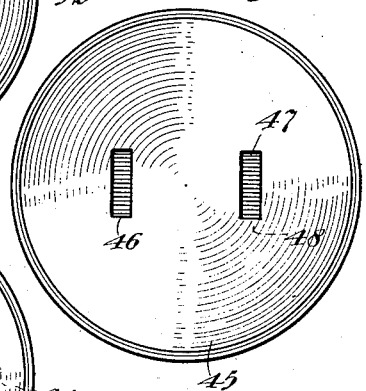
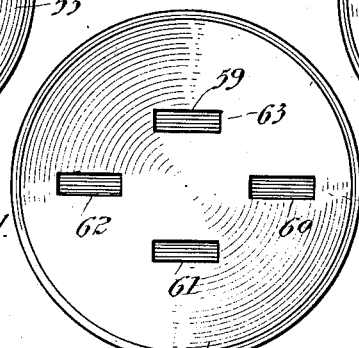
Witnesses:
W. T. Smith
Inventor:
Reuben B. Benjamin
by Jones, Addington, Ames & Seibold
Attys.

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRICAL CONNECTOR.

1,319,920. Specification of Letters Patent. Patented Oct. 28, 1919.

Application filed April 27, 1916, Serial No. 94,039. Renewed March 22, 1919. Serial No. 284,513.

*To all whom it may concern:*

Be it known that I, REUBEN B. BENJAMIN, a citizen of the United States, residing at Chicago, in the county of Cook and State of Illinois, have invented new and useful Improvements in Electrical Connectors, of which the following is a full, clear, concise, and exact description, reference being had to the accompanying drawing, forming a part of this specification.

My invention relates to electrical connectors, and more specifically to caps for separable attachment plugs and similar receptacles.

One of the objects of my invention is to provide an improved cap in which the contact is adjustable to enable the cap to be used with different types of receptacles.

In the drawings in which two embodiments of my invention are shown;

Figs. 6, 7, 8, 9, 10 and 11 are diagrammatic plan views of different types of receptacles with which the cap can be used;

Fig. 12 is a plan view of a modified form of cap;

Fig. 13 is a similar view showing the contacts shifted to a different position;

Fig. 14 is a side elevation of Fig. 12;

Fig. 15 is a section on the line 15—15 of Fig. 13; and

Fig. 16 is a plan view of the binding plate.

Figure 1:
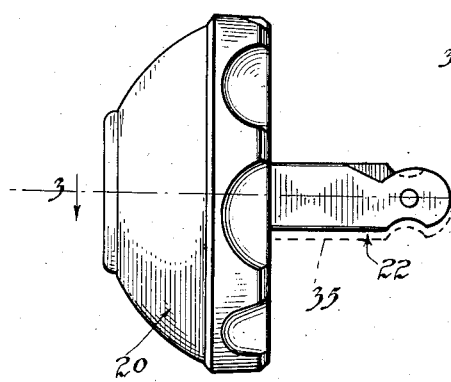
Figure 1 is a side elevation of a cap having contacts for quick detachable engagement with the contacts of a receptacle.

Referring to the drawings in detail, and first to the form of cap shown in Figs. 1, 2, 3, 4 and 5, this cap comprises an insulating thumb piece and support 20, binding terminals 21 secured to and supported by this thumb piece, and a pair of shiftable contacts 22 each electrically connected to one of the binding terminals 21. The thumb piece 20 is provided with a central opening 23 for the leading in wires. Each binding terminal 21 is seated in a recess 24 in the support 20 and is secured to this support by means of an eyelet 25. A binding screw 26 engages the bared end of the conductor to hold it in place.

Each of the shiftable contacts 22 comprises a blade portion 27 for engagement with the contact of a receptacle, and a base portion 28 for engagement with the binding terminal 21 to which it is secured by means of a screw 29 slidable in a slot 30 in the binding terminal. When the screws 29 are tightened they will hold or secure the shiftable contacts 22 in any adjusted position due to the clamping action of the screws, which will bind the base portion 28 of the contact 22 to the binding terminal 21 to further insure the positive fixing, securing, holding or locking of the shiftable contacts 22 in their different adjusted positions. The base portion 28 of the contact is provided with a lug 31 which can engage either of the recesses 32 or 33 in the binding terminal. A nut 34 is provided for the screw 29 and the support 20 is recessed at 34$^a$ to permit the screw 29 to slide in the slot 30. If desired one of the contact blades 27 may be made wider than the other, as indicated in dotted lines at 35 (Fig. 1) in order to make a "polarity" connector, that is, a connector in which the same contact on the cap will always engage the same contact on the receptacle.

Figure 2:
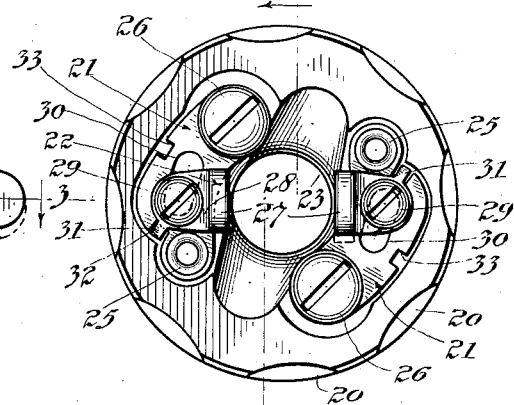
Fig. 2 is a plan view of Fig. 1.
Figure 3:
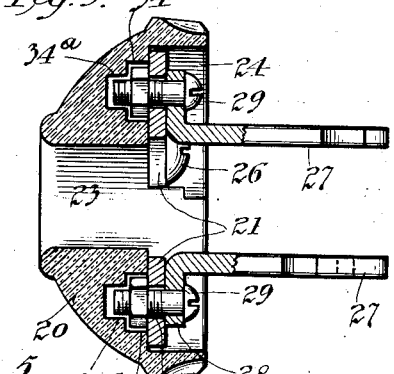
Fig. 3 is a section on the line 3—3 of Fig. 1.
Figure 4:
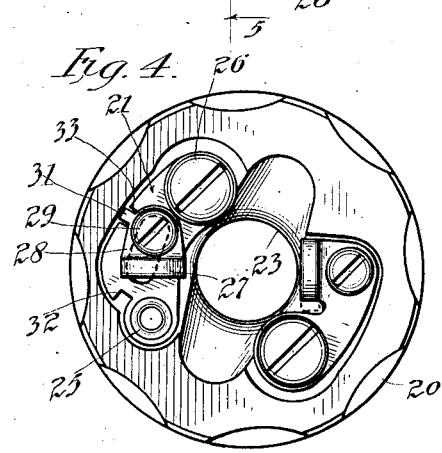
Fig. 4 is a plan view showing the contacts in a different position from that shown in Fig. 2.
Figure 5:
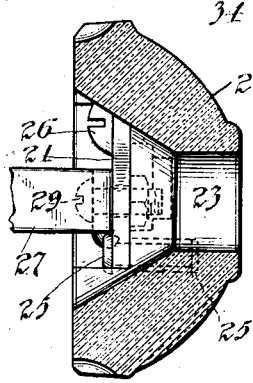
Fig. 5 is a section on the line 5—5 of Fig. 2.

In Fig. 2 the contact blades 27 are shown lying in parallel planes opposite each other. In Fig. 4 they are shown lying in planes perpendicular to each other. To change them from the position shown in Fig. 2 to the position shown in Fig. 4 one of the screws 29 is loosened sufficiently to permit the lug 31 to disengage the recess 32. The contact 22 is then turned and slid with respect to the binding terminal 21, the screw 29 sliding in the slot 30 until the lug 31 registers with the recess 33. The screw 29 is then again tightened up.

If it is desired to have both of the blades 27 lie in the same plane the other blade can also be shifted as just described.

Figure 6:
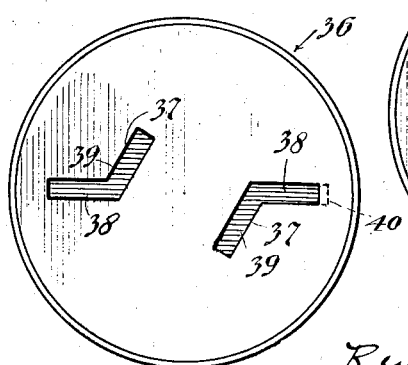

The receptacle 36 shown in Fig. 6 has a pair of openings 37 angular in cross section, each comprising a portion 38, which portions lie in the same plane, and a portion 39 at an angle to the portion 38 and which portions are in parallel planes and opposite each other.

This receptacle will accommodate the cap shown in Figs. 1, 2, 3 and 4, with the contact blades of the cap all adjusted to lie in the same plane or adjusted to lie opposite each other in parallel planes. If desired one of the portions 38 may be made wider than the other portion 38 as indicated in dotted lines at 40 to receive the wider contact blade indicated in dotted lines at 35 in Fig. 1.

Figure 7:
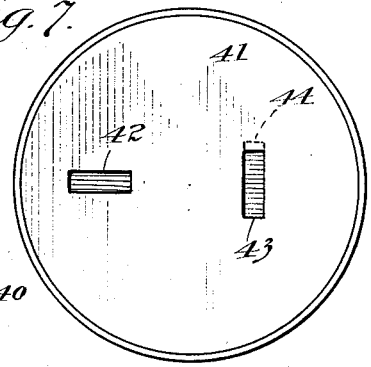

The receptacle 41 shown in Fig. 7 is provided with openings 42 and 43 for the contact blades of the cap, which openings lie in planes perpendicular to each other. These openings will receive the cap shown in Figs. 1, 2, 3 and 4, when the contact blades are in the position shown in Fig. 4. The opening 43 may be made wider than the opening 42 if desired, as indicated in dotted lines at 44 to accommodate the wider blade indicated at 35 (Fig. 1) to form a polarity receptacle.

The receptacle 45 shown in Fig. 8 is provided with two openings 46 and 47 opposite each other in parallel planes to receive the contact blades 27 in the position shown in Fig. 2. The opening 47 may be made wider than the opening 46 if desired, as indicated at 48 for polarity purposes.

The receptacle 49 shown in Fig. 9 is provided with two openings 50 and 51 lying in the same plane to receive the contacts of the cap when both contacts are shifted to lie in the same plane. The opening 51 may be made wider, as indicated at 52, for polarity purposes.

The receptacle 53 shown in Fig. 10 is provided with two T-shaped openings 54 and 55 to receive the contact blades of the cap shown in Figs. 1, 2, 3 and 4, either in the position shown in Fig. 2 or in the position shown in Fig. 4, or in the position in which the blades lie in the same plane. In this form also the opening 55 may be made wider, as indicated at 56 and 57 for polarity purposes.

The receptacle 58 shown in Fig. 11 is provided with four openings 59, 60, 61 and 62, the openings 59 and 61 being opposite each other in parallel planes and the openings 60 and 62 lying in the same planes. In this form the openings 59 and 60 may be made wider as indicated at 63 and 64 for polarity purposes. This receptacle will accommodate the cap with the contact blades either in the position shown in Fig. 2 or with both the blades shifted so as to lie in the same plane.

It will be noted that by shifting the contact blades of the cap shown in Figs. 1, 2, 3 and 4, they can be made to properly engage any of the receptacles shown in Figs. 6, 7, 8, 9, 10 and 11.

The cap shown in Figs. 12, 13, 14, 15 and 16 comprises an insulating thumb piece or support 65, a pair of binding terminals 66 supported by this thumb piece and a pair of shiftable contacts 67 secured to the support 65. The thumb piece is provided with a central opening 68 for the passage of the leading in wires, and with recesses 69 to accommodate the binding terminal 66.

Each of the shiftable contacts 67 comprises a blade portion 70 for quick detachable engagement with the contact of a receptacle and a base portion 71 secured to the binding terminal 66 by means of a screw 72 threaded into a nut 73 embedded in the insulating thumb piece. For holding the shiftable contact 67 in its different adjusted positions the base portion 71 of the contact is provided with a lug 74 which can register with either of the recesses 75 or 76 in the binding terminal 66.

To shift the contact 67 from the position shown in Fig. 12 to the position shown in Fig. 13 the screws 72 are loosened up sufficiently to permit the lugs 74 to disengage the recesses 76 and the contact blades are then turned until the lugs 74 register with the opening 75 when the screws are again tightened up. When the contacts are in the position shown in Fig. 12 the cap will fit any of the receptacles shown in Figs. 6, 9, 10 and 11. With the contacts in the position shown in Fig. 13 the cap will fit the receptacles shown in Figs. 6, 8, 10 and 11. This cap cannot be made to fit the receptacle shown in Fig. 7. By shifting only one of the contacts from the position shown in Fig. 13 the cap may be used as a polarity device with the receptacle shown in Fig. 6 as one of the blades will then enter one of the portions 38 of the openings in the receptacle and the other blade will enter the portion 39 of one of the openings in the receptacle.

Having thus described my invention what I claim as new and desire to secure by Letters Patent is:—

1. A detachable electrical connection device comprising an insulating base and two contacts supported thereby and extending substantially in the same direction therefrom, for quick detachable engagement with the contacts of a receptacle, and means for securing one of said contacts in different positions relative to said base comprising a screw for clamping said contact to said support, said screw likewise serving as a pivot for said contact.

2. A detachable electrical connection device comprising an insulating base and two contacts supported thereby and extending substantially in the same direction therefrom for quick detachable engagement with the contacts of a receptacle, and means for securing one of said contacts in different positions relative to said base comprising a screw for clamping said contact to said support, said contact being rotatable about the axis of said screw.

3. A detachable electrical connection device comprising an insulating base and two contacts supported thereby and extending substantially in the same direction therefrom for quick detachable engagement with the contacts of a receptacle, and means for securing one of said contacts in different positions relative to said base comprising a screw for clamping said contacts to said support, said contacts being rotatable about the axis of said screw, said screw being slidably mounted with respect to said base.

4. A detachable electrical connection device comprising an insulating base, a binding plate supported thereby, and a contact for quick detachable engagement with the contact of a receptacle, and means for securing said contact in different positions relative to said binding plate, said binding plate and contact being provided with inter-engaging means for retaining them in said different positions.

5. A detachable electrical connection device comprising an insulating base, a binding plate supported thereby and a contact for quick detachable engagement with the contact of a receptacle, and means for securing said contact in different positions relative to said binding plate, said binding plate and contact being provided with inter-engaging means for retaining them in said different positions, said securing means comprising a screw for clamping said contact against said plate.

6. A detachable electrical connection device comprising an insulating base, a binding plate supported thereby, and a contact for quick detachable engagement with the contact of a receptacle, means for securing said contact in different positions relative to said binding plate, said binding plate and contact being provided with inter-engaging means for retaining them in said different positions, said securing means comprising a screw for clamping said contact against said plate, said contact having a base portion through which said screw extends, and a blade portion extending substantially perpendicular to said base portion.

7. A detachable electrical connection device comprising an insulating base, a binding plate supported thereby, and a contact for quick detachable engagement with the contact of a receptacle, and means for securing said contact in different positions relative to said binding plate, said binding plate and contact being provided with inter-engaging means for retaining them in said different positions, said securing means comprising a screw for clamping said contact against said plate, said plate having a slot in which said screw is slidable.

8. A detachable electrical connection device comprising an insulating base and two contact blades supported thereby and extending substantially in the same direction therefrom for quick detachable engagement with the contacts of a receptacle, and means for securing said contact blades in different positions relative to said base, said contact blades when in one of said positions lying substantially in the same plane, and when in another of said positions lying substantially opposite each other in parallel planes.

9. A detachable electrical connection device comprising an insulating base and two contact blades supported thereby and extending substantially in the same direction therefrom for quick detachable engagement with the contacts of a receptacle, and means for securing said contact blades in different positions relative to said base, said contact blades when in one of said positions lying substantially opposite each other in parallel planes, and when in another of said positions lying in planes perpendicular to each other.

10. A device of the class described, comprising a cap, contact blades extending substantially at right angles to the base of the cap, and a screw and slot connection for adjustably securing the said blades to said cap to be moved in various angular positions with relation to each other while maintaining their longitudinal axes substantially parallel.

11. A device of the class described comprising a cap, contact blades extending substantially at right angles to the base of the cap, a screw and slot connection for adjustably securing the said blades to said cap to be moved in various angular positions with relation to each other while maintaining their longitudinal axes substantially parallel, and locking means adapted to retain the blades in position against accidental displacement.

12. A detachable electrical connection device comprising an insulating base and a contact supported thereby for quick detachable engagement with the contact of a receptacle, and means for securing said contact in different positions relative to said base whereby said contact can be made to properly engage the contact of different types of receptacles.

13. A detachable electrical connection device comprising an insulating base and two contacts supported thereby and extending substantially in the same direction therefrom for quick detachable engagement with the contacts of a receptacle, and means for securing one of said contacts in different position relative to said base whereby said contacts can be made to properly engage contacts of different types of receptacles.

14. An attachment plug having jack-blades adjustable to different relative angular positions, and means for holding the blades in their adjusted positions.

15. An attachment plug having relative adjustable pivoted jack-blades and means for holding the blades in adjusted position.

16. A connector member for electrical attachment plugs, bases, etc., comprising a body having a central opening for the electric wires, a pair of terminal plates having binding screws for the wires, a pair of connector blades pivotally engaged with said plates and means for fixing said blades in different adjusted positions.

17. A connector member for electrical attachment plugs, bases, etc., comprising a body having a central opening and segmental recesses, terminal plates seated in said recesses having binding screws for the wires, connector blades having pivot screws to secure said blades and plates together upon said body, and stops to limit the turning movement of said blades.

18. An attachment plug having a jack-blade adjustable to different relative angular positions, and means for holding the blade in its adjusted position.

19. A connector member for electrical attachment plugs, bases, etc., comprising a body having a wire opening therein, and a connector blade in pivotal connection therewith and provided with a wire binding screw, and means for positively locking the blade in different angular positions, whereby the blade is positioned against accidental displacement.

20. An attachment plug having a jack-blade adjustable to different relative positions to coöperate with terminals of receptacles of different types, and means for positively locking the jack-blade in the different positions whereby the blade is retained in these positions against accidental displacement.

21. An attachment plug having a jack-blade adjustable to different relative angular positions, and means for positively locking the jack-blade in the said different angular positions.

22. An attachment plug having a pivotally supported jack-blade, and means for locking said jack-blade in different positions about said pivotal support.

23. A connector member for electrical attachment plugs, bases, etc., comprising a body having terminals in the form of blades adjustably mounted thereon and adapted to be set in different angular relations, and means for positively locking the said blades in said different angular relations.

In witness whereof, I have hereunto subscribed my name.

REUBEN B. BENJAMIN.